J. W. PLATT.
Machine for Removing Broken Drills from Holes.

No. 163,406.  Patented May 18, 1875.

Witnesses
Jno. L. Boone
C. M. Richardson

Inventor
John W. Platt
by Dewey & Co
Attys

UNITED STATES PATENT OFFICE.

JOHN W. PLATT, OF MINERAL CITY, NEVADA.

IMPROVEMENT IN MACHINES FOR REMOVING BROKEN DRILLS FROM HOLES.

Specification forming part of Letters Patent No. 163,406, dated May 18, 1875; application filed March 25, 1875.

*To all whom it may concern:*

Be it known that I, JOHN W. PLATT, of Mineral City, White Pine county, State of Nevada, have invented a Device for Removing Broken Drills from Holes; and I do hereby declare the following description and accompanying drawings are sufficient to enable any person skilled in the art or science to which it most nearly appertains to make and use my said invention without further invention or experiment.

My invention relates to a novel device for removing stubs and broken pieces of drills from drill-holes; and it consists in the employment of a pair of jaws, so shaped that they can be introduced around the stub, and then firmly closed, so as to withdraw it. The operating mechanism is inclosed and protected by a case.

Figure 1:
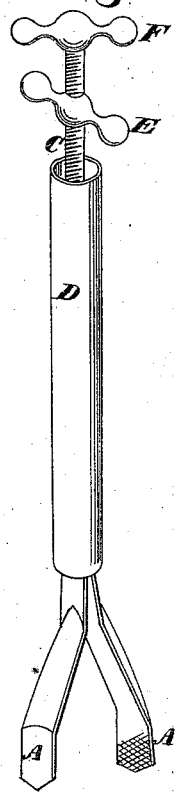
Figure 2:
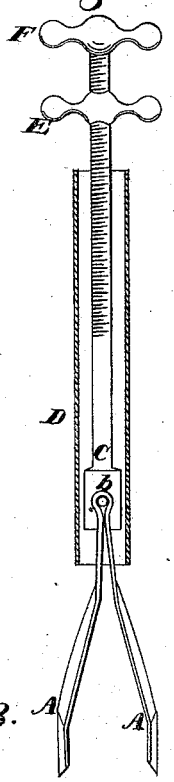
Figure 3:
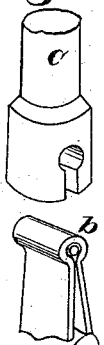

Referring to the accompanying drawing for a more complete explanation of my invention, Figure 1 is an elevation of my device. Fig. 2 is a longitudinal section, showing the interior of the case; Fig. 3, details to be referred to.

A A are two griping-jaws, which are so curved as to form cylindrical sections; and their inner faces may be roughened, to enable them to grasp anything more firmly. The ends of these jaws are tapered to a blunt apex, and they are scarfed to an edge also, this being for the purpose of making it easy to work the jaws down through the dirt and rock that may be in the hole surrounding the stub. The sides of the jaws taper toward each other at the top, and unite, so as to form a transverse cylindrical head, *b*. This head is fitted into a hole bored transversely through the lower end of the stem C, and a slot opens downward from this hole, to allow the sides of the jaws to pass in. The stem C passes up through a cylindrical sleeve or case, D, within which it is protected; and the upper end of the stem has a screw cut upon it, so that the handle or elongated nut E can be turned up or down, as desired. A stationary handle, F, is fixed to the top of the stem, and by this it is held while the nut E is being turned.

The operation of my device will be as follows: If a drill becomes broken in the hole the nut E is turned back, and the elasticity of the sides of the jaws A causes them to spread apart and draw out of the case D until they are sufficiently well opened to pass down upon each side of the drill. The stem is now twisted from side to side by means of its handle F, and the jaws will be worked down upon each side of the broken stub, so as to clasp it. Now, by turning the handle or nut E the cylindrical case D will be forced down over the jaws, thus forcing them together, and causing them to compress the stub firmly, so that the whole can be withdrawn, the occupation not occupying more than a minute or two, even in holes three or four feet deep.

If the jaws should become broken or injured, it will only be necessary to remove the handle F and the nut E, so as to allow the stem C to be slipped out, when the head *b* will easily slide from its socket, and can be replaced by another.

Having thus described my invention, what I claim, and desire to secure by Letters Patent, is—

1. The jaws A, tapered and beveled as shown, in combination with the stem C, case D, handle F, and operating-nut E, substantially as herein described.

2. The transverse cylindrical head *b* of the jaws A, in combination with the stem C, said head fitted to slide into a hole in the lower end of the stem C, and retained in place by the case D, substantially as herein described.

In witness whereof I hereunto set my hand and seal.

JOHN WRIGHT PLATT. [L. S.]

Witnesses:
 F. F. HILP,
 E. DAVID.